United States Patent [19]

Vance

[11] 4,276,950
[45] Jul. 7, 1981

[54] POWER ASSISTED PEDICYCLE

[75] Inventor: John M. Vance, Bryan, Tex.
[73] Assignee: J. Wylie Harris, Jr., Houston, Tex.
[21] Appl. No.: 29,096
[22] Filed: Apr. 11, 1979
[51] Int. Cl.³ .............................................. B62D 57/04
[52] U.S. Cl. ..................................... 180/7 P; 180/205;
 280/212; 415/119
[58] Field of Search .......... 180/7 P, 205, 219, 65 DD;
 280/212; 244/64; 415/119, 174

[56] References Cited

U.S. PATENT DOCUMENTS

| | | | |
|---|---|---|---|
| 1,179,138 | 4/1916 | Pascal | 180/205 |
| 2,409,887 | 10/1946 | Murphy | 180/205 |
| 3,735,593 | 5/1973 | Howell | 415/119 |
| 3,947,148 | 3/1976 | Holt | 415/174 |
| 4,059,168 | 11/1977 | House | 180/7 P |

FOREIGN PATENT DOCUMENTS 456429 8/1913 France ..................................... 180/7 P
737897 12/1932 France .............................. 180/65 DD

*Primary Examiner*—John J. Love
*Assistant Examiner*—Donn McGiehan
*Attorney, Agent, or Firm*—Fulbright & Jaworski

[57] ABSTRACT

A power assisted pedicycle. The present invention is directed to a power assisted pedicycle such as a bicycle or tricycle. The power assisted pedicycle has a power package having a housing having therein an engine directly driving a propeller which provides motive force. A throttle control cable extends from the engine to a point on the pedicycle at which it may be conveniently adjusted.

4 Claims, 3 Drawing Figures

POWER ASSISTED PEDICYCLE

BACKGROUND OF THE INVENTION

1. Field of the Invention

The present invention is in the field of power assisted pedicycles.

2. Description of the Prior Art

The prior art teaches bicycles and motor bikes which are power assisted by various means. In some prior art devices, the motive force of a motor or engine is transmitted to the wheel of the bicycle by means of a chain. In other prior art devices, the motor or engine's power is transmitted to the wheels by means of a drive shaft or other mechanical drive. In still other prior art devices, power is transmitted from a motor or engine to a tire of the bicycle by means of friction rollers. The prior art teaches the use of both electrical and gasoline powered engines and motors. When these prior art bicycles are operated in a "power off" mode, the rider must provide enough power to move himself, the bicycle, and the heavy mechanical drive.

SUMMARY OF THE PRESENT INVENTION

The present invention is directed to a power assisted pedicycle; for example but not limited to power assisted bicycles or tricycles. The power package includes a housing having therein an engine which directly drives a propeller thereby providing motive force. A throttle control cable extends from the engine to some point on the pedicycle at which it may be conveniently adjusted such as handlebars. The engine may be enclosed within a suitable acoustic material to reduce noise level. The power package is secured to the frame of the pedicycle preferably in the rear.

It is, therefore, an object of the present invention to provide a power assisted pedicycle.

Another object of the present invention is the provision of a conventional pedicycle having a power package attached thereto.

Yet another object of the present invention is the provision of a power assisted pedicycle having a power package attached to the framework of the pedicycle to the rear of the rider.

A further object of the present ivention is the provision of such a power assisted pedicycle wherein the power package includes a housing having therein an engine which directly drives a propeller thereby providing motive force.

A particular object of the present invention is the provision of such a power package in which the housing is cylindrical and the engine is a two-cycle engine.

Another object of the present invention is the provision of such a power assisted pedicycle in which a throttle control extends from the engine to a place of the pedicycle where it may be conveniently adjusted.

A particular object of the present invention is the provision of such a throttle control that is located on the handle bars of the pedicycle.

Yet another object of the present invention is the provision of such a power assisted pedicycle in which the engine is enclosed by an acoustic lining material to reduce noise level.

A further object of the present invention is the provision of a circumferential groove or soft wearable material about the interior periphery of the housing of the engine which encloses about the tips of the propeller to provide a closure between the propeller and the interior wall of the housing when the propeller is rotating thereby promoting efficiency of operation.

A still further object of the present invention is the provision of such a power assisted pedicycle in which the housing has a protective guard such as wire mesh screen mounted at both of its ends to prevent the entry of foreign objects or human limbs into the housing.

Another object of the present invention is the provision of such a power assisted pedicycle which will require no clutch, gears, belts or other mechanical drive.

Yet another object of the present invention is the provision of such a power assisted pedicycle wherein the power package is relatively light weight.

A further object of the present invention is the provision of a power assisted pedicycle wherein the pedicycle brakes may be operated independently of the power package.

An additional object of the present invention is the provision of such a power assisted pedicycle wherein the engine is started by means of a pull mechanism or crank and spring mechanism.

A particular object of the present invention is the provision of a power assisted bicycle.

Another particular object of the present invention is the provision of a power assisted tricycle.

Other and further objects, features and advantages will be apparent from the following description of the present preferred embodiments of the invention, given for the purpose of disclosure, when taken into conjunction with the accompanying drawings.

BRIEF DESCRIPTION OF THE DRAWINGS

In the attached drawings, like character references designate like parts throughout the several views, which views are as follows.

DESCRIPTION OF THE PREFERRED EMBODIMENT

The present invention is directed to power assisted pedicycles. A pedicycle is a wheeled vehicle that is moved by power imparted to the wheels by the force of the rider's feet on a pedalling mechanism. For purposes of the description of the preferred embodiment of the invention, a power assisted bicycle will be described; but it is to be understood that the present invention is directed to other pedicycles.

Figure 1:
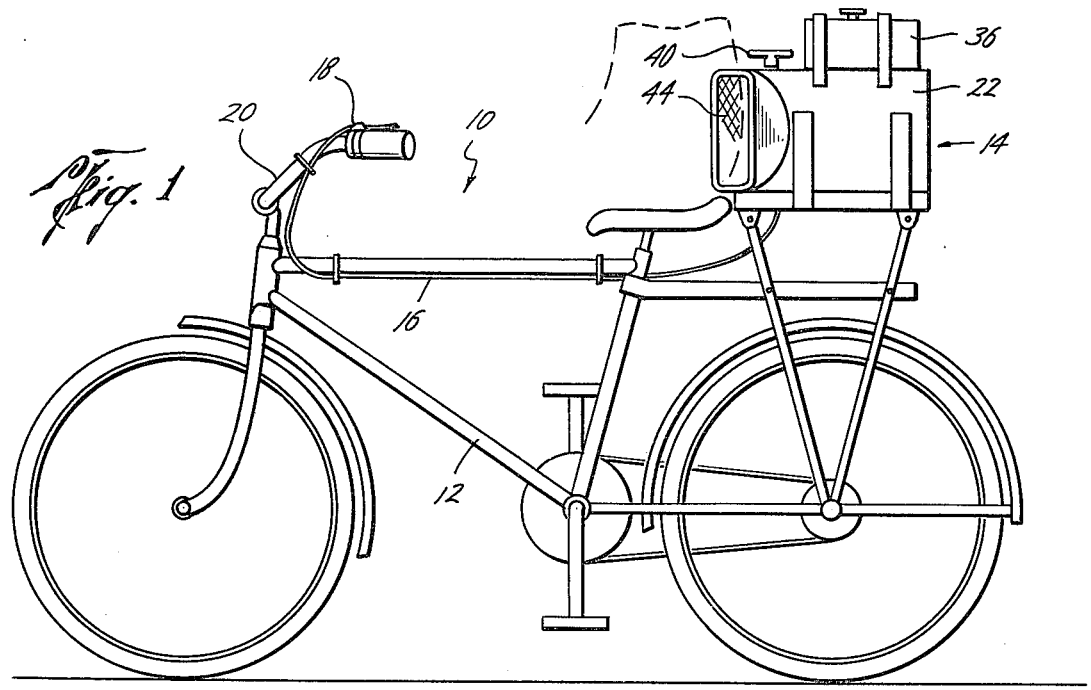
FIG. 1 is a side elevation view showing a power assisted bicycle according to the present invention.

Referrring now to the drawings, FIG. 1 illustrates a conventional bicycle 10 having framework 12 secured rearwardly thereof and forming a support for a power package 14. A throttle cable 16 extends from the power package 14 to a throttle control lever 18 mounted on the handle bars 20 of the bicycle 10.

Figure 3:
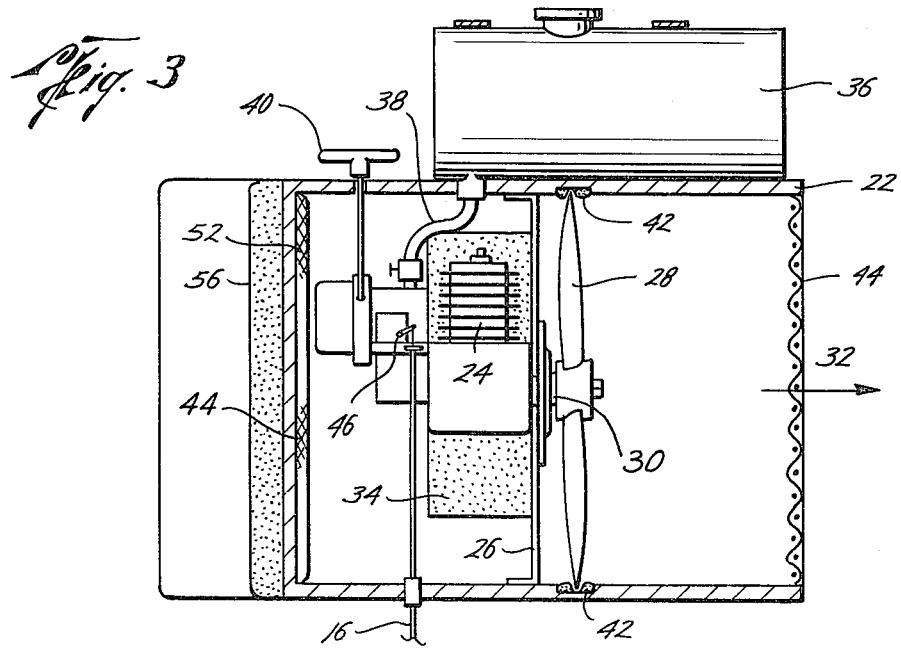
FIG. 3 is a side elevation view of the power package shown in FIG. 1 with the housing cut away.

Referring now to FIG. 3, the power package 14 includes a cylindrical housing 22 having secured therein a conventional gasoline engine 24, the engine 24 preferably comprising a lightweight two-stroke type engine. The engine 24 is secured to the housing 22 by a suitable bracket 26. A propeller 28 is mounted on the drive shaft 30 of the engine. The pitch and direction of rotation of the drive shaft 30 are oriented in order that the flow of air moves in the direction of the arrow 32 thereby providing motive force for the bicycle 10. Preferably, a suitable acoustic lining material 34 substantially encloses the engine 24 to reduce noise levels that are generally characteristic of small gasoline engines. A fuel tank 36 is secured to the cylindrical housing 22, and a fuel line 38 permits communication of gasoline or other appropriate fuel from the tank 36 to the engine 24. The throttle control line 16 connects the throttle member 46 of the engine 24 with the control lever 18 as shown in FIG. 1. Also provided is a pull member 40 for purposes of starting the engine 24 although it will be appreciated that a variety of starting mechanisms may be employed.

As indicated by the reference character 42, tip clearance material is embedded in a circumferential groove 48 about the interior periphery of the cylindrical housing 22 and substantially adjacent the path of rotation of the propeller 28. The tip clearance material 42 may be any suitable material, preferably fibrous in nature. The function of the tip clearance material is to enclose about the tips of the propeller 28 and thus in effect provide a closure between the propeller 28 and the interior wall of the housing 22 when the propeller 28 is rotating, so that movement of air around the tips is substantially foreclosed thereby insuring that the air propelled by the propeller moves through the path cut by the propeller and not around or outside of that path.

Protective guards 44 such as wire mesh screen enclose both ends of the housing 22 to prevent entry of human limbs or other objects and yet permit flow of air as indicated by the direction of the arrow 32.

Figure 2:
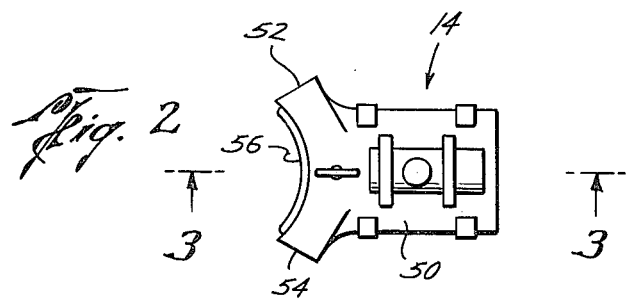
FIG. 2 is a top plan view showing an air intake geometry for the housing of the power package.

FIG. 2 illustrates the housing for the power package 14. The housing 50 has dual air intakes 52 and 54 which are positioned so that they project away from the rider to enhance the rider's safety and comfort. The recess 56 formed integrally of the housing 50 can serve as a backrest for the rider.

In use, the engine 24 is started by means of the pull mechanism 40, and speed of the engine is regulated by means of the throttle lever 18. Initial inertia of the bicycle 10 is best overcome by means of the rider making conventional use of the pedals 11 as illustrated in FIG. 1. Thereafter, the engine 24 powers the bicycle 10 although additional pedalling action may be necessary when ascending inclines and the like. Advantageously, the power package 14 of the present invention is not geared into the bicycle 10 and, as a result, there is not loss of efficiency owing to gearing and the like.

While the power package according to the present invention has been described in association with a bicycle, it is to be understood that the power package can be used with other pedicycles without departing from the spirit and scope of the invention.

What is claimed is:

1. A power assisted pedicycle comprising
   a frame
   a plurality of wheels, each wheel rotatably mounted to the frame
   a seat for the rider mounted on the frame
   a set of handlebars mounted to the frame
   a power package having
   a housing secured to the rear of the frame of the pedicycle behind the seat, the interior of the housing having a circumferential groove lined with fibrous material, the housing having a rear end having a protective guard mounted over it to prevent foreign objects from entering the housing, and a front end having formed integrally thereof two opposed air inlets which project outwardly and away from the plane of the pedicycle, each air inlet having a protective guard mounted over it,
   an engine mounted within the housing, the engine having a drive shaft extending therefrom, the engine enclosed in a suitable acoustic material to reduce noise generated by the engine, the engine having a throttle,
   a throttle control extending from the throttle to the handle bars and secured to the handle bars so that the speed of the engine is conveniently adjustable,
   a pull mechanism connected to the engine and extending through the housing for starting the engine,
   a propeller secured to the drive shaft and mounted so that the tips of the propeller travel in the circumferential groove of the housing immediately adjacent the fibrous material thereby providing motive force, and
   a fuel tank in fluid communication with the engine.

2. In combination with a pedicycle having a frame, a plurality of wheels rotatably mounted to the frame, a seat mounted on the frame and a set of handlebars mounted on the frame, a power package comprising
   a housing secured to the rear of the frame of the pedicycle behind the pedicycle seat, the interior of the housing having a circumferential groove lined with fibrous material, the housing having a rear end having a protective guard mounted over it to prevent foreign objects from entering the housing and a front end having formed integrally thereof two opposed air inlets which project outwardly and away from the plane of the pedicycle, each air inlet having a protective guard mounted over it,
   an engine mounted within the housing, the engine having a drive shaft extending therefrom, the engine enclosed in a suitable acoustic material to reduce noise generated by the engine, the engine having a throttle,
   a throttle control extending from the throttle to the handlebars and secured to the handlebars so that the speed of the engine is conveniently adjustable,
   a pull mechanism connected to the engine and extending through the housing for starting the engine,
   a propeller secured to the drive shaft and mounted so that the tips of the propeller travel in the circumferential groove of the housing immediately adjacent the fibrous material thereby providing motive force, and
   a fuel tank secured to the housing and in communication with the engine.

3. A power assisted pedicycle comprising,
   a frame,
   a plurality of wheels, each wheel rotatably mounted to the frame,
   a seat for the rider mounted on the frame,
   a set of handlebars mounted to the frame,
   a power package having
   a housing secured to the rear of the frame of the pedicycle behind the seat, the interior of the housing having a circumferential groove lined with fibrous material, the housing having a rear end having a protective guard mounted over it to prevent foreign objects from entering the housing, and a front end having formed integrally thereof a plurality of air inlets which project outwardly and away from the plane of the pedicycle, each air inlet having a protective guard mounted over it, an engine mounted within the housig, the engine having a drive shaft extending therefrom, the engine enclosed in a suitable acoustic material to reduce noise generated by the engine, the engine having a throttle, a throttle control extending from the throttle to the handlebars and secured to the handlebars so that the speed of the engine is conveniently adjustable, a pull mechanism connected to the engine and extending through the housing for starting the engine, a propeller secured to the drive shaft and mounted so that the tips of the propeller travel in the circumferential groove of the housing immediately adjacent the fibrous material thereby providing motive force, and a fuel tank in fluid communication with the engine.

4. In combination with a pedicycle having a frame, a plurality of wheels rotatably mounted to the frame, a seat mounted on the frame, and a set of handlebars mounted on the frame, a power package comprising a housing secured to the rear of the frame of the pedicycle behind the pedicycle seat, the interior of the housing having a circumferential groove lined with fibrous material, the housing having a rear end having a protective guard mounted over it to prevent foreign objects from entering the housing and a front end having formed integrally thereof a plurality of air inlets which project outwardly and away from the plane of the pedicycle, each air inlet having a protective guard mounted over it, an engine mounted within the housing, the engine having a drive shaft extending therefrom, the engine enclosed in a suitable acoustic material to reduce noise generated by the engine, the engine having a throttle, a throttle control extending from the throttle to the handlebars and secured to the handlebars so that the speed of the engine is conveniently adjustable, a pull mechanism connected to the engine and extending through the housing for starting the engine, a propeller secured to the drive shaft, and mounted so that the tips of the propeller travel in the circumferential groove of the housing immediately adjacent the fibrous material thereby providing motive force, and a fuel tank secured to the housing and in fluid communication with the engine.

* * * * *